United States Patent

Dauble et al.

[11] Patent Number: 5,930,345
[45] Date of Patent: Jul. 27, 1999

[54] PUBLIC TELEPHONE CLIP-ON FRAUD PREVENTION SYSTEM

[75] Inventors: Steven F. Dauble, Dumont; Joseph I. Hermo, Summit; Ming Ho Lee, Holmdel; Astley George Nelson, Edison, all of N.J.

[73] Assignee: Lucent Technology Inc., Murray Hill, N.J.

[21] Appl. No.: 08/858,940

[22] Filed: May 20, 1997

[51] Int. Cl.[6] ............................ H04M 17/00; H04M 1/66; H04M 15/00
[52] U.S. Cl. ............................ 379/145; 379/130; 379/199
[58] Field of Search .................................... 379/143, 144, 379/145, 155, 154, 142, 189, 196, 197, 198, 199, 200, 130; 455/410, 411, 406, 407, 408

[56] References Cited

U.S. PATENT DOCUMENTS

| | | | |
|---|---|---|---|
| 5,448,760 | 9/1995 | Frederick | 455/411 |
| 5,590,184 | 12/1996 | London | 379/142 |
| 5,737,701 | 4/1998 | Rosenthal et al. | 455/411 |
| 5,815,807 | 9/1998 | Osmani et al. | 455/410 |
| 5,844,978 | 12/1998 | Reuss et al. | 379/144 |

*Primary Examiner*—Paul Loomis
*Attorney, Agent, or Firm*—Frederick B. Luludis; Daniel J. Piotrowski

[57] ABSTRACT

To prevent so-called "clip-on" fraud from occurring at a public telephone station, such as a coin operated public telephone, a unique signature identifier is transmitted at the telephone following the transmission of the dialed number. If remote equipment determines that the expected identifier is not correct, or it fails to receive the signature, then the remote equipment terminates the call. Once the call is completed, then the public telephone is expected to periodically transmits a second identifier. The completed call may also be terminated if the remote equipment does not receive the expected second identifier at an expected rate or if a received second identifier is not correct.

21 Claims, 3 Drawing Sheets

WAVE SHAPE OF CURRENT PULSE

PUBLIC TELEPHONE CLIP-ON FRAUD PREVENTION SYSTEM

FIELD OF THE INVENTION

The invention relates to public telephones, such as public pay telephones, and more particularly relates to dealing with connecting a non-public telephone to a telephone line connected to a public telephone for the purpose of placing a telephone call without having to use the public telephone.

BACKGROUND OF THE INVENTION

Most of the intelligence needed to handle a telephone call originating from a public telephone, e.g., a public payphone, has been moved from the central office to the public telephone. This move has made it easier to initiate telephone service without requiring certain signaling, e.g., coin control signals, and/or particular connections, e.g., a connection to a telephone operator. Because of this move, certain individuals have discovered that they can connect ("clip-on") their own telephone sets directly to the telephone line connecting to a public telephone, thereby bypassing the public telephone, and thus make a "free" telephone call. Clearly, such an action is fraudulent and amounts to a theft of telephone service.

One prior solution uses an ISDN based public telephone to deal with this type of fraud. It can be appreciated that a solution that employs ISDN is indeed expensive. Another prior solution arranges a public telephone so that it continuously transmits a so-called out-of-band signal, e.g., a 16 kHz signal, that is expected by the local central office to prevent "clip-on" fraud. That is, the central office will drop calls seemingly originating from a public telephone if the central office fails to receive the out-of-band signal. The reasoning behind this solution is that a fraudulent non-public telephone would not be arranged to transmit such a signal. It is apparent that this arrangement may be easily avoided simply by adding an oscillator capable of generating the expected out-of-band signal to the fraudulent non-public telephone.

SUMMARY OF THE INVENTION

We have recognized that to avoid clip-on fraud effectively, a solution needs to identify, in accord with the principles of the invention, the public telephone set that is originating a telephone call and identify that telephone set in a unique way for the duration of the call. Specifically, in accordance with an aspect of the invention, we use a station identifier which is generated as a function of the dialed digits but which is different for each call irrespective of whether multiple calls are placed to the same telephone number, thereby making it exceedingly difficult to use a public telephone to place a call and then clip-on another telephone set for the duration of the call, or to maintain the called connection for a long duration of time.

DETAILED DESCRIPTION

The prevention of "clip-on" fraud, in accordance with the principles of the present invention, is partitioned into two phases. The first phase covers the origination and initial processing ("setting up") of a call. The second phase covers the talking state after the call has been completed and answered by the called party.

Figure 1:
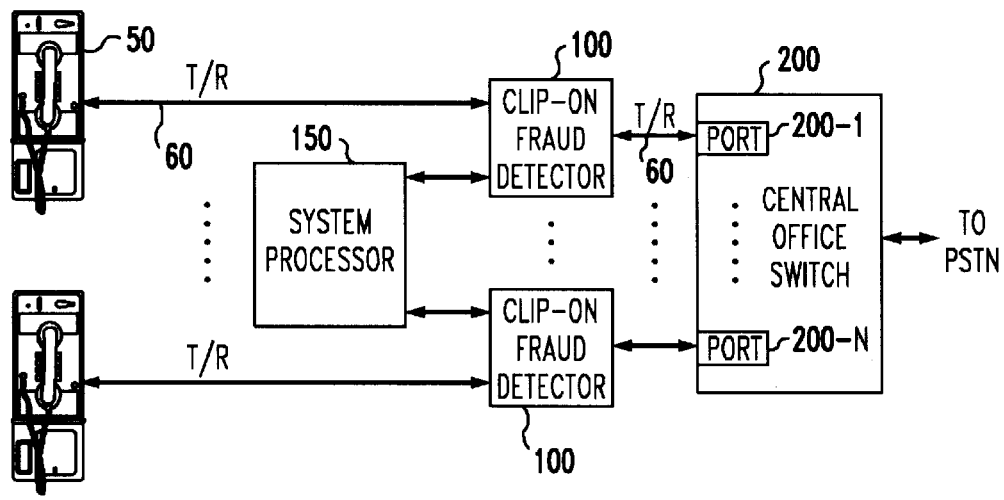
FIG. 1 is a broad block diagram of a telecommunications system in which the principles of the invention may be practiced.

During the first phase, public telephone 50 shown in FIG. 1 stores a copy of a telephone number dialed by a user in local memory. Once the payment for the call being placed has been resolved, i.e., by the depositing the appropriate amount of money, public phone 50, which may be, e.g., a public coin telephone, seizes the telephone line 60 by, for example, closing the tip (t) and ring (r) leads of telephone line 60. (Such a seizure is commonly referred to as "loop start".) As is well-known, a central office switch 200, which may be, for example, a 5ESS® switch available from Lucent Technologies Inc., recognizes the closing of the loop as a request for service and returns dial tone over telephone line 60.

In response to receipt of dial tone, public telephone 50 outpulses in a conventional manner (e.g., using DTMF tones) the telephone number dialed by the user. Public telephone 50 then outpulses, in accordance with the principles of the invention, its signature identifier (ID) formed from a sequence of characters, e.g., five character numbers represented by corresponding DTMF tones. Specifically, the signature ID is a combination of different signals, e.g., DTMF signals, that is different for each call and is defined, in accordance with an aspect of the invention, by the following expression:

$$BazCp \qquad (1)$$

where the B and C signals are not the standard DTMF signals that are shown on a conventional DTMF telephone keypad, i.e., the letters b and c in the abc combination associated with the digit 2, but are the B and C DTMF signals respectively representing numbers 11 and 12 that are found on the so-called "military" DTMF keypad that has four columns of buttons, rather than three columns of buttons; "a" equals the units digit of the decimal sum of a particular group of the digits transmitted to the central office, e.g., the last five digits, in which such digits may be, e.g., the last five of the dialed number, calling card number or credit card number; "z" is a random number selected from a range of numbers, e.g., a range between one and thirteen (i.e., a binary code between 0 to d); and "p" is the unit digit of the sum of a predetermined group of numbers, e.g., the group from the numbers B, a, z and C. The signal representing "p" is transmitted last.

For example, assume that the dialed number is 011-353-91-567439. The sum of the last five digits of the transmitted telephone number is 29. therefore the value of "a" is 9. Also assume that the random number of 2 is generated for "z". The value of "p" is then B+a+z+C=11+9+2+12=34. The value of "p" is thus 4 and the resulting signature ID is B-9-2-C-4, where the DTMF tone for B is transmitted first.

Public telephone 50 delays the transmission of the signature ID over line 60 by a predetermined amount of time following the transmission of the call set up signals including the dialed telephone number. The delay is a function of the type of call, e.g., local call, international call, in-country long distance call, or toll call, being placed over telephone 50 as determined in a conventional manner from the dialed digits. For the latter types of calls the delay may be, for example, 400 millisec., 15 seconds, 2 seconds, and 1 second, respectively.

Clip-on fraud detector circuit 100, which monitors the tip and ring leads of line 60, acquires a copy of the outpulsed telephone number as a result of such monitoring and supplies the number to central processor 150 which is common to detectors 100. Detector circuit 100 also acquires and sends to processor 150 a copy of the signature ID that public telephone 50 transmits over line 60. Processor 150 then generates its own copy of the expected signature ID using the random number contained in the received signals and compares that copy with the signature ID that was received from public telephone 100. If the copy compares with the transmitted ID then processor 150 allows call to progress. Otherwise, processor 150 directs detector circuit 100 to open the closed loop formed by the tip (t) and ring (r) leads of line 60, thereby terminating ("dropping") the call.

When CO 200 receives the last of outpulsed telephone digits via line 60 and its associated port circuit 200-1 serving that line, then CO 200 forwards the call toward its destination. If the call is a local call, then such forwarding may involve connecting port circuit 200-1 to another CO 200 port circuit connected to a telephone line extending to the called station. If the call is other than a local call, e.g., an in-country long distance call, then CO 200 forwards the call to a destination switch (not shown) via the public switched telephone network (PSTN).

During the call, public telephone 50 periodically identifies itself by transmitting a second signature ID, in accordance with an aspect of the invention. Such periodicity (or repetition rate) is determined at public telephone 50 and at detector 100 as a function of the transmitted signature ID. For example, as a function of the decimal value of the transmitted signature ID. Thus, for the above signature ID example, the periodicity may be 38/2=19 seconds—which means that public telephone 60 transmits its second ID every 19 seconds during the call. In accordance with another aspect of the invention the second ID is a current pulse in combination with the determined repetition rate, in which the amplitude of the current pulse may be of a fixed duration, e.g., 250 milliseconds, and of sufficient level to produce a change in the level of the current flowing in line 60 current, for example a change of 1.5 to 5 milliamperes. In an illustrative embodiment of the invention, the first current pulse should be transmitted at the determined repetition rate value following the transmission of the transmitted signature ID, but no longer than 30 seconds, for example. Thus, if the determined repetition rate is 19 seconds, then the first current pulse should be transmitted 19 seconds after the transmission of the signature ID, and every 19 seconds thereafter.

Central processor 150 similarly determines (for each call that is monitored by an associated detector 100) the repetition rate after performing the aforementioned signature ID comparison. Processor 150 then waits for the receipt of a current pulse via the respective detector 100 at the end of the determined rate. If processor 150 does not receive the first expected pulse from the respective detector 100, then processor 150 extends the wait period to a maximum of 30 seconds. If processor 150 does not receive an indication from the respective detector 100 that the expected first current pulse was received within the extended period of time, then processor 150 terminates the associated call in a conventional manner, e.g., processor 150 directs that detector 100 to open the line 60 loop. If, on the other hand, processor 150 receives the expected pulse, and the shape of the received pulse compares favorably with an expected (or template) shape, then processor 150 allows the associated call to continue. Thereafter, processor 150 expects to receive a current pulse at the expected rate via the respective detector 100, and will terminate the associated call connection if the rate of the received pulse does not substantially conform with the expected rate.

Figure 2:
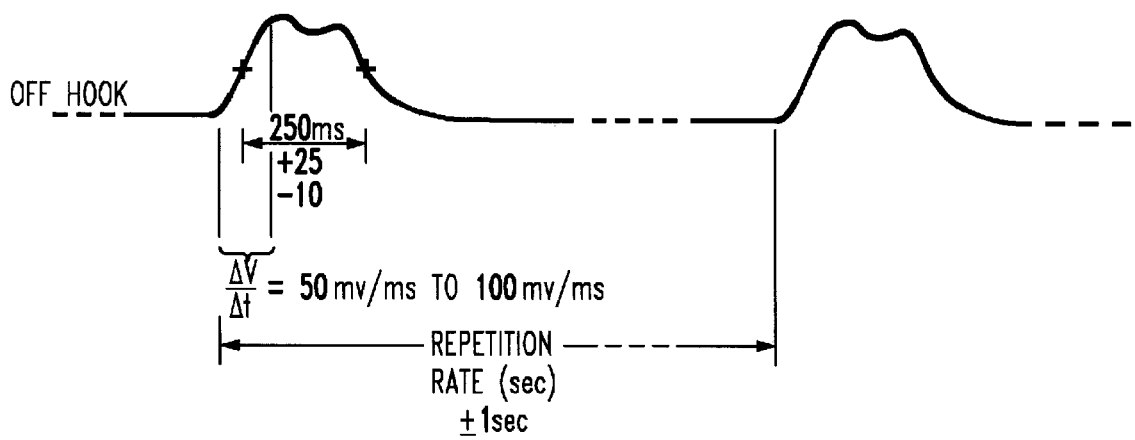
FIG. 2 is an illustrative example of a signature pulse generated in accordance with the principles of the invention.

An illustrative example of a series of current pulses transmitted at some expected rate is shown in FIG. 2. A public telephone arranged in accordance with the invention generates a current pulse in a conventional manner, i.e., by changing the resistance of the loop circuit (telephone line) extending to the CO. This may be done by using a frequency generator to pulse the telephone line, in which the generated pulse has a fairly slow rise time so that it does not disturb the call (i.e., it is unintrusive). An illustrative rise time of 50 millivolts to 100 millivolts per millisecond (50 mv/ms to 100 mv/ms) is shown for the shape of the pulse illustrated in FIG. 2.

Figure 3:
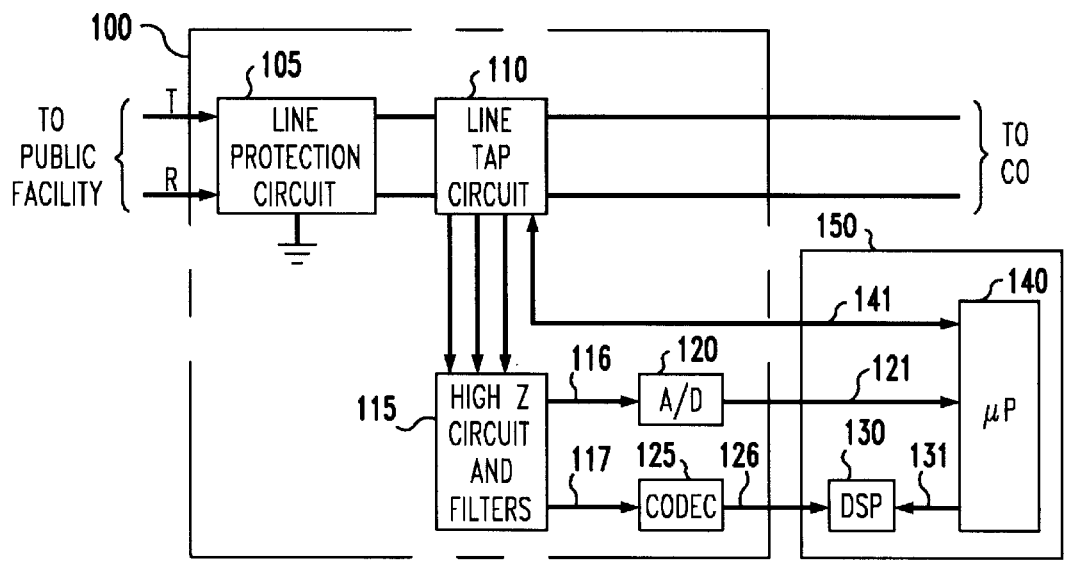
FIG. 3 is a detailed block diagram of the system processor and clip-on fraud detector of FIG. 1.

A block diagram of detector 100 and processor 150 is shown in FIG. 3. It is seen that detector 100 includes a conventional line protector circuit 105 to absorb voltage surges and to deal with so-called power cross that could occur if the tip and/or ring leads come into contact with high ac voltage. In particular, line protector 105 includes a conventional "crowbar" circuit which operates whenever the voltage level on the tip and ring lead exceeds 250 volts. At that point, the crow-bar circuit operates shunting the voltage signal to ground. Line protector 105 also includes a conventional fusible resistor which opens the tip and ring loop if the loop comes in contact with a source of high ac voltage. If such contact occurs, the fusible resistor heats up and operates due to thermal stress (in a manner similar to a conventional fuse) opening the tip and ring loop.

Detector 100 also includes a conventional line tap circuit 110 which provides a 21 ohm tap in the tip and ring circuit to acquire a copy of the signals traversing the tip and ring leads. For example, if a ringing signal is flowing right to left over the tip and ring leads (hereinafter T&R leads), then a portion of the signal is acquired by the tap and supplied to high impedance (z) and filter circuits 115 (hereinafter also circuit 115).

The line tap also acquirers a portion of the dc signals as well as DTMF signals traversing the T&R leads. Circuit 115 filters out high frequency noise from the signals that it receives from tap circuit 110 and also scales the level of a tapped signal to a lower level readily handled by circuit 120. The dc and ringing signals are presented to analog to digital (A/D) converter 120 via lead 116, and the DTMF signals pass through filter circuits 115 to codec 125 via lead 117. (In an illustrative embodiment of the invention, codec 125 may be, for example, the model 7506 codec available from Lucent Technologies Inc.)

Conventional A/D circuit 120 digitizes the level of the signals, for example, the aforementioned signature pulse as well as off-hook/on-hook dc signals and ringing signals, that it receives from circuit 115 and supplies a digital version of the signals via lead 121 to microprocessor ($\mu$p) 140 of central processor circuit 150. Microprocessor 140 uses such signals to track the off-hook/on-hook status of the respective T&R leads. It also compares a received digital version of a transmitted signature pulse with a template to ensure that the shape of that signal substantially conforms with an expected shape, and also tracks the repetition rate of the pulse in the manner described above.

DSP 130 of central processor 150 analyzes the signals that it receives from codec 125 to determine if a signal corresponds to a digit, e.g., a dialed digit or signature ID digit, and stores the determination in local memory. When it has stored sufficient digits to form a telephone number and signature ID, it then passes those digits to microprocessor 140. Microprocessor 140 then determines if the signature ID is correct using the dialed telephone number and random digit contained in the signature ID. If the signature ID is not correct then, microprocessor 140 directs the respective line tap circuit 110 via the associated lead 141 to open the T&R loop as a way of terminating the associated call. If the signature ID is correct, then microprocessor 140 calculates the repetition rate of the second signature ID and sets a timer to conform to that rate. If microprocessor 140 receives a first signature pulse from a respective detector 100 at a point in time close to the expiration of the associated timer, then microprocessor 140 resets that time to wait for the next signature pulse from that detector 100. As mentioned above, if the first signature pulse is not received as expected, then microprocessor 140 invokes a grace period to wait up to 30 seconds for the pulse and terminates the associated call if it does not receive the pulse within the grace period. Microprocessor 140 will also terminate the call if thereafter the rate at which the pulses are received do not conform more or less with the expected rate. It is noted that if the signals that microprocessor 140 receive from AID circuit 120 correspond to ringing signals, then microprocessor 140 does nothing, since the ringing signals indicate that the call is terminating at the associated public telephone, i.e., it is an incoming call.

Figure 4:
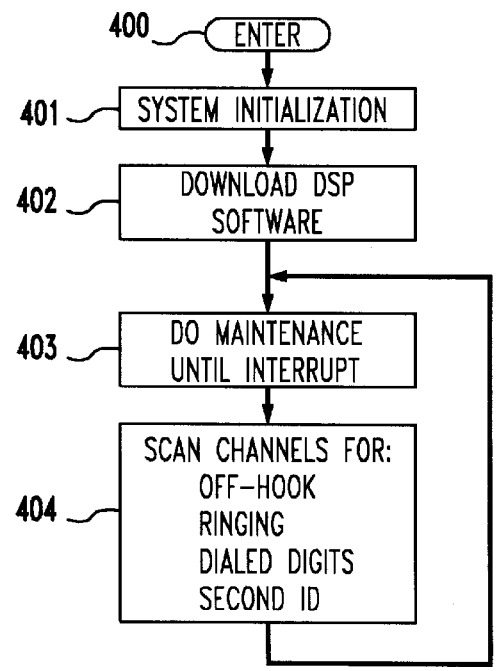
FIGS. 4 and 5 illustrate in flow chart form the program which implements the principles of the invention in the system processor of FIG. 1.

FIG. 4 illustrates the program which controls the operation of microprocessor 140. Specifically, in response to a system reset, the program is entered at block 400 where it proceeds to block 401. At block 401, the program initializes system parameters and its internal memory that it uses for storing information that it receives from respective ones of the detectors 100 that it serves. The program also sets up a so-called config.file defining the configuration of associated memory. The configuration specifies the allocation of the memory to the various telephone lines that processor 140 monitors. Processor 140, in turn, configures (maps) and tests the memory according to the specification stored in the config.file. The program also initializes various peripheral devices, e.g., A/D converter 120. The program then proceeds to block 402 where it reads a DSP program (i.e., the call information analysis software) stored in EPROM (erasable programmable read only memory) and then downloads the software to associated DSP 130 via DMA (direct memory access) interface. The program then causes DSP 130 to start operating and run the software. DSP 130 under control of such software distinguishes the dialed digits for the transmitted signature ID. The program then proceeds to block 403 where it performs conventional maintenance functions and collecting data relating to the various telephone lines that are monitored between periodic system interrupts which prompt the program to jump to block 404. (It is noted that such interrupt occurs every N milliseconds, for example, every 0.50 milliseconds. At block 404, the program scans, in turn, each of the channels respectively associated with the detectors 100. Each such channel comprises a lead 121 extending from a respective one of the A/D converters 120 and a bus 131, in which microprocessor 140 under control of the program accesses via bus 131 information relating to a channel (telephone line) call that DSP 130 stores in such memory. The information that microprocessor 140 obtains from such scanning is stored in internal memory in association with the addresses of the respective detectors 100. When the program has completed the processing information obtained as result of scanning a channel, then it scan a next channel. The program then returns to block 403 when it has completed the scanning of all of the channels that it serves.

Figure 5:
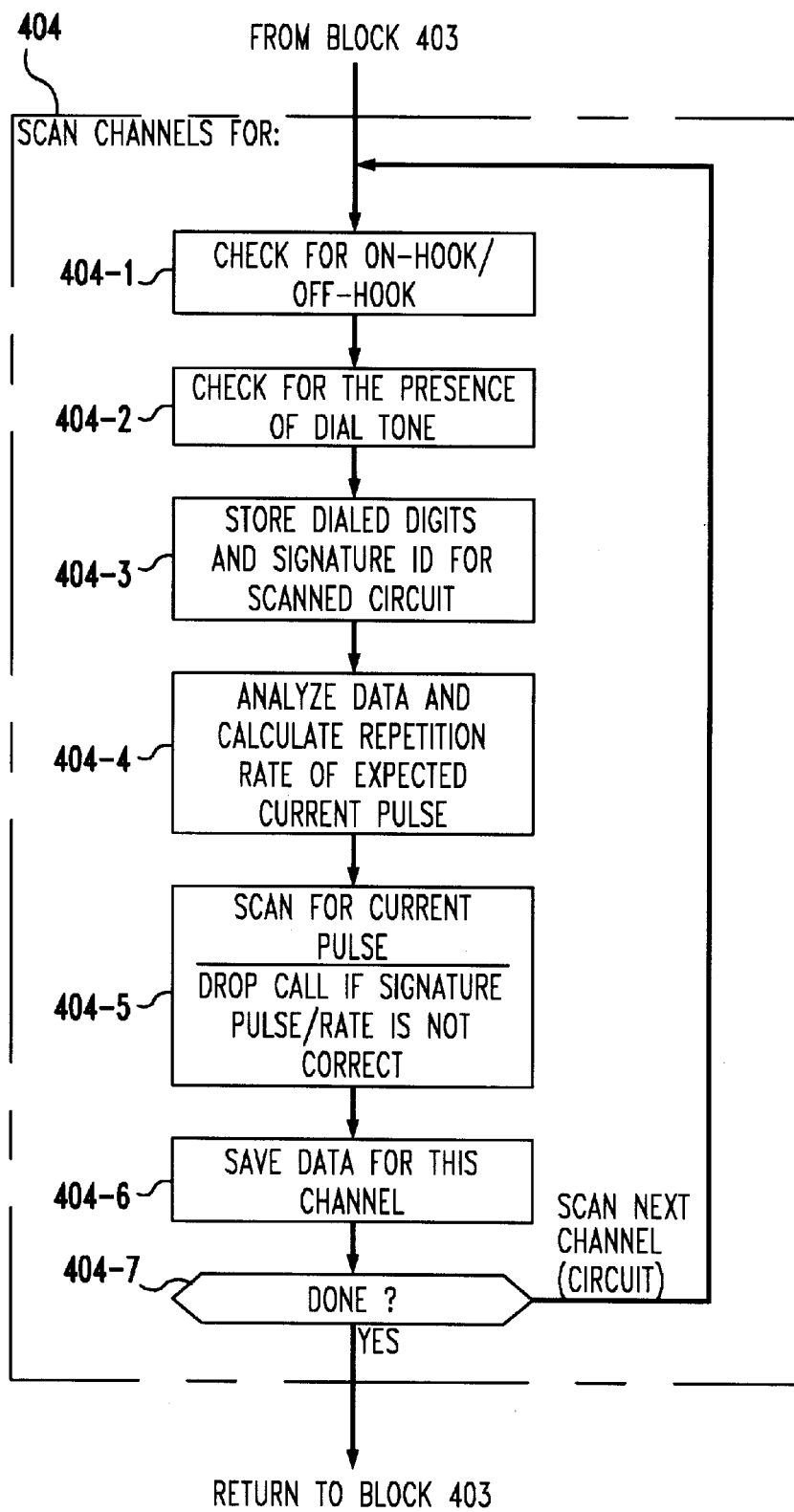

An expanded version of block 404 is shown in FIG. 5. Specifically, the program reads a status word from a memory buffer (not shown) associated with the scanned channel/circuit and then processes the data that it obtained from A/D converter 120 and/or DSP 130 for the circuit. If the status word indicates that the associated telephone line is on-hook, then the program at block 404-1 checks to see if the information indicates that the line is now off-hook. If the data shown indicates that the line is still on-hook then the program scans the next channel. If the information indicates that the scanned circuit is not off-hook, then the program updates the status work to reflect the current status of the associated telephone line. The program then goes on to scan the next channel.

If the status word indicates that the telephone line is off-hook, then the program (block 404-2) checks the data that it received from the associated DSP 130 to see if dial tone is present on the line. If not, then the program goes on to scan the next line. If so, then the program updates the status word to reflect that state. If, on the other hand the status word indicates that dial had been detected, then the program (block 404-3) checks the data that it obtained from the scanned channel/circuit to see if contains all of the dialed digits and signature ID. If not, then the program goes on to scan the next channel. If so, then the program (404-4) processes the signature ID in the manner discussed above to determine if ID is correct. If not, then the program causes processor 140 to drop the call as discussed above. If the received ID is correct, then the program calculates in the manner discussed above the repetition rate for expected second signature ID (e.g., current pulse) and stores that calculation in the status word. If the foregoing has already been completed, then the program (404-5) scans for the signature current pulse and it repetition rate as discussed above and drops the call if the signature current pulse and/or repetition rate is not in line with the expected pulse and rate. Following the foregoing, the program (block 404-6) stores the scanned information/data in associated memory assigned to the scanned channel. It then checks (block 404-7) to see if it has completed scanning all of the channels that it serves. If not, then the program scans the next channel and processes the scanned information/data in the described manner. Otherwise, the program returns to block 403.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A communication system comprising first communications equipment connected to a communication line, said first communications equipment comprising;

a transmitter for transmitting over the communication line information entered by a user, and apparatus for generating a signature identifier as a function of the user entered information and transmitting the signature identifier over the communications line, second communication equipment disposed along said communications line, said second communication equipment comprising a detector for monitoring the communications line and acquiring a copy of the transmitted user information and a copy of the transmitted signature identifier, and a processor for processing the received user information and signature identifier and terminating user communications over the communications line if the received signature identifier is not correct.

2. The system of claim 1 wherein said user information is a telephone number and said communications line is a telephone line.

3. The system of claim 1 wherein the user information is a telephone number and the signature identifier is formed from at least a group of the digits forming the telephone number and a random number.

4. The system of claim 1 wherein said signature is formed from (a) a group of digits of a telephone number entered by the user as said user information, (b) a random number, (c) the B and C DTMF characters, and (d) a value formed from the elements (a), (b) and (c).

5. The system of claim 1 wherein said first communications equipment is a public telephone.

6. The system of claim 1 wherein said first communications equipment further compromises apparatus for periodically transmitting over said communications line following the transmission of said signature identifier a second identifier different from the signature identifier.

7. The system of claim 6 wherein the value of said periodicity is derived as a function of said signature identifier.

8. The system of claim 7 wherein said second identifier and the value of said periodicity form said second identifier.

9. The system of claim 6 wherein said detector of said second communication equipment acquires a copy of the second identifier when it is transmitted and said processor of said second communication equipment includes apparatus operative for terminating said user communications over the communications line if second identifier is not correct.

10. The system of claim 9 wherein said apparatus operative for terminating said user communications over the communications line if second identifier is not correct is also operative for terminating said user communications over the communications line if said second identifier is received at a rate different from said periodicity.

11. Communications equipment connected to a communications line, said communications equipment comprising a transmitter, responsive to a user entering user information, for transmitting the user information over said communications line, and apparatus that generates a first identifier as a function of the user information and then causes the first identifier to be transmitted over said communications line following the transmission of the user information.

12. The communications equipment of claim 11 wherein said apparatus includes apparatus that generates a second identifier and periodically transmits the second identifier over said communications line following the transmission of said first identifier.

13. The communications equipment of claim 11 wherein said periodicity has a value that is derived as a function of the first identifier.

14. The communications equipment of claim 11 wherein the user information is a telephone number and the first identifier is formed from at least a group of the digits forming the telephone number and a random number.

15. The communications equipment of claim 11 wherein said first identifier is formed from (a) a group of digits of a telephone number entered by the user as said user information, (b) a random number, (c) the B and C DTMF characters, and (d) a value formed from the elements (a), (b) and (c).

16. The communications equipment of claim 11 wherein the communications equipment is a public telephone.

17. The communications equipment of claim 12 wherein the second identifier is a current pulse having a predetermined shape.

18. The communication equipment of claim 12 wherein the second identifier and said periodicity form an identifier.

19. Communications equipment disposed along a communications line comprising:

a detector for monitoring the communications line and acquiring a copy of user information transmitted at a source equipment over the communications line, and acquiring a copy of a signature identifier that the source transmits over the communications line following the transmission of the user information, wherein said source generates said signature identifier as a function of said user information, and a processor for processing the received user information and signature identifier and terminating user communications over the communications line if the received signature identifier is not correct.

20. Communications equipment disposed along a communications line comprising:

a detector for monitoring the communications line and acquiring a copy of user information transmitted at a source equipment over the communications line, and acquiring a copy of a signature identifier that the source transmits over the communications line following the transmission of the user information, and a processor for processing the received user information and signature identifier and terminating user communications over the communications line if the received signature identifier is not correct, wherein said processor includes a process for processing a second identifier received over the communications line in which the second identifier is different from the signature identifier and is transmitted by the source at a predetermined periodic rate and for terminating user communications over the communications line if the second identifier does not match an expected identifier or is not received at the periodic rate.

21. The communications equipment of claim 19 wherein said source is a public telephone and said user information is a telephone number.

* * * * *